May 16, 1933.   J. A. WINTROATH   1,909,560
INTERMEDIATE BEARING CONSTRUCTION
Filed Oct. 7, 1929   2 Sheets-Sheet 1

INVENTOR:
John A. Wintroath,
BY
ATTORNEY.

May 16, 1933.  J. A. WINTROATH  1,909,560
INTERMEDIATE BEARING CONSTRUCTION
Filed Oct. 7, 1929   2 Sheets-Sheet 2
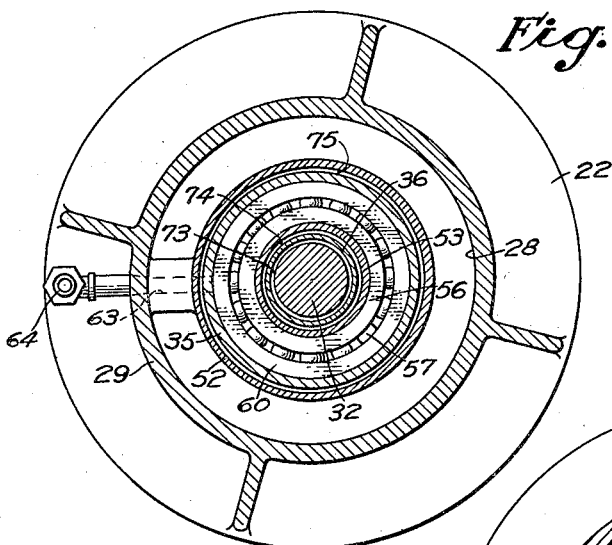
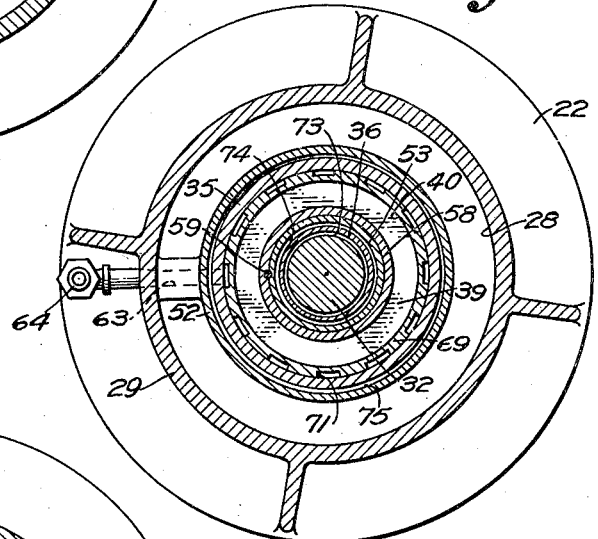
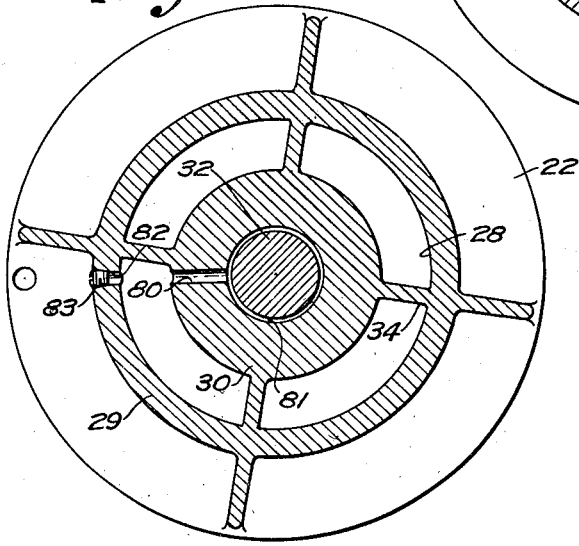
INVENTOR:
John A. Wintroath,
By
Ford W. Harris
ATTORNEY Patented May 16, 1933

1,909,560

UNITED STATES PATENT OFFICE

JOHN A. WINTROATH, OF LOS ANGELES, CALIFORNIA, ASSIGNOR TO WINTROATH PUMPS, LTD., OF ALHAMBRA, CALIFORNIA, A CORPORATION OF CALIFORNIA

INTERMEDIATE BEARING CONSTRUCTION

Application filed October 7, 1929. Serial No. 397,930.

This invention relates to a submersible bearing structure which may be submerged in a liquid and which is so constructed that a body of lubricant may be held therein in such a manner as to protect the bearing element from contact with the liquid in which the bearing structure is submerged.

The invention is especially adapted for use with vertical rotary pumps of the character used in the pumping of water from deep wells. In such pumps an assembly of stages or pump members is suspended in a well. In the stages or pump bowls, rotary impellers are carried on a substantially vertical shaft. Between the pump bowls and at various points throughout its length the shaft is carried in sleeve bearings which are subject to very severe wear during operation of the pump, owing to the fact that water pumped from wells carries with it quantities of sand. This sand, entering the bearings previously mentioned, causes them to rapidly wear to such an extent that the shaft is left without proper support, which results in the failure to operate the pump impellers in properly centralized positions.

I have found that the disadvantages due to the cutting out of bearings within the pump structure as a result of sand being carried thereinto may be practically eliminated by supporting the shaft, which extends through the assembly of pump bowls, in bearings which are sealed from access of water and sand at several points throughout its length, the number and spacing of the bearings employed depending on the length, diameter, and stiffness of the shaft.

In the preferred form of my invention disclosed herein, an anti-friction bearing is employed with means for properly lubricating such bearing and for preventing foreign and harmful substances from getting into the working parts of the bearing by placing one or more of such bearings in the bowl assembly of a pump. The shaft and rotary impellers are thus supported in such a manner as to prevent whipping and destruction of adjacent sleeve bearings due to vibration such as occurs in the ordinary types of pumps employing sleeve bearings when such sleeve bearings have become worn to an extent permitting whipping, chattering, or vibration of the rotary parts of the pump.

I am not, however, limited to a deep well pump having an extensible line shaft, my invention finding utility whether or not such a line shaft is used, and also finding utility in other capacities where bearing structures are necessary.

It is an object of my invention to provide a submersible bearing structure, having cooperative stationary and rotary parts, in which a bearing recess is formed, there being a suitable bearing in said recess and means for delivering a lubricant to the bearing recess during or after the assembly of the pump or before or during its operation within a well.

A further object of the invention is to provide a bearing structure including cooperating stationary and rotary parts, each of which parts includes annular or tubular walls which cooperate in such a manner as to retain a lubricant therein regardless of a drop in fluid level to a point therebelow, and to prevent entry of foreign fluids when such recess or bearing chamber is filled with a lubricant.

A further object of the invention is to provide a bearing structure of the above character which may be readily incorporated in an assembly of pump bowls or stages and which will support the shaft in operating alignment for a period of time far exceeding the useful life of sleeve bearings which are employed in the pump assembly in the previous forms of construction.

A further object of the invention is to provide a bearing structure of the above character with a delivery duct through which lubricant may be fed to the bearing chamber from an accessible position, such as at the top of a well adjacent to the outlet or discharge end of the pump.

A further object of the invention is to provide, in combination with a bearing structure adapted to prevent entry of foreign fluids or substances when the bearing chamber thereof is filled with lubricant, a means for delivering lubricant to the bearing chamber and a means operative in conjunction with said delivery means for preventing the forcing of lubricant from the bearing chamber due to the internal fluid pressure occurring in the pump assembly when the pump is in operation.

A further object of the invention is to provide a bearing structure of this character having a space therein for trapping of any sediment which might enter the bearing chamber and having means for delivering lubricant to the interior of the bearing chamber at a point remote from the bottom of the chamber in order to avoid possibility of any trapped sediment being picked up by the entering lubricant.

Further objects and advantages of my invention will be made evident in the following part of the specification:

Referring to the drawings which are for illustrative purposes only,—

Fig. 3 is a cross-section taken on a plane indicated by the line 3—3 of Fig. 2, this cross-section being drawn to a smaller scale than Fig. 2.

Fig. 4 is a cross-section corresponding to Fig. 3 but being on a plane represented by the line 4—4 of Fig. 2.

Fig. 5 is a cross-section on a plane represented by the line 5—5 of Fig. 2.

Figure 1:
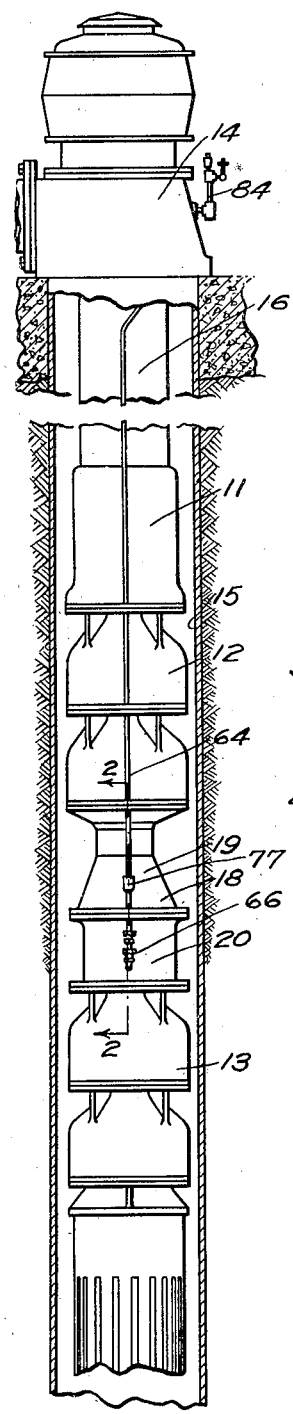
Fig. 1 is a diagrammatic view showing a deep well turbine pump having a bearing structure embodying the present invention included therein.
Figure 2:
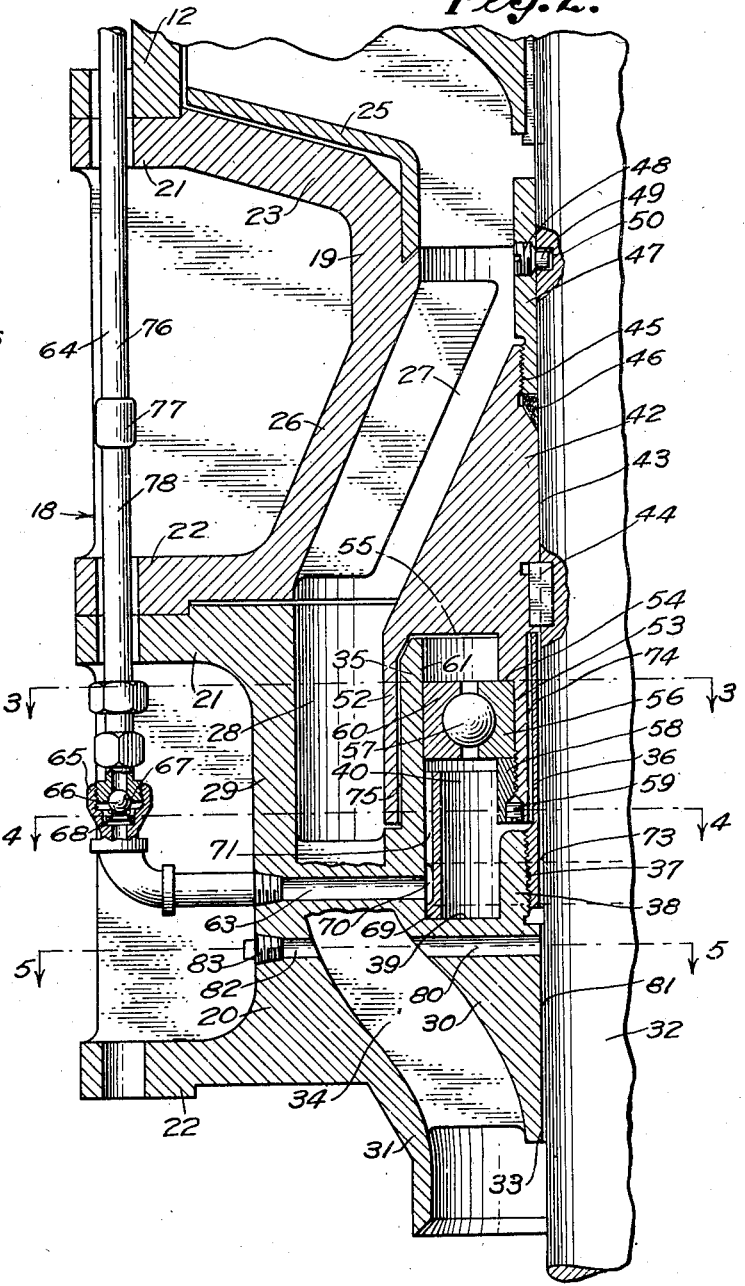
Fig. 2 is an enlarged fragmentary section, as indicated by the line 2—2 of Fig. 1, showing the preferred form of the invention.

Although my improved submersible bearing structure is adapted to many other uses, I have in Fig. 1 shown a device with which it is especially valuable, such device consisting of a vertical rotary or turbine pump 11 including upper and lower bowls or stages 12 and 13 which are supported from a discharge head 14 situated at the top of a well 15 by means of a discharge column 16. Between the upper and lower bowls 12 and 13 is placed a form of my improved submersible bearing structure 18 which, as also shown in Fig. 2, consists of a casing including an upper casing 19 and a lower casing 20 provided with flanges as indicated at 21 and 22 whereby the casings 19 and 20 are secured together and to the adjacent upper and lower bowls 12 and 13. The upper casing 19 has its upper wall 23 so formed that the lower portion of an impeller 25 in the upwardly adjacent pump bowl 12 may operate therein, and has its intermediate wall structure 26 formed to include fluid or water passages 27 which slope downwardly and outwardly so as to communicate at their lower ends with water passages 28 which extend through the casing 20 between the outer wall 29 and the central body 30 of such lower casing 20. Projecting downwardly from the lower central portion of the casing 20 is an annular wall structure 31 which projects into the upper end of the downwardly succeeding pump bowl 13. The body 30 is bored to receive a pump shaft 32 on which the pump impellers, such as shown at 25, are supported and rotated.

The body 30 is of small diameter at its lower end 33 and enlarges in upward direction to follow the general contour of the lower portion of the fluid passages 28. Webs 34 extend between the outer wall 29 of the casing 20 to the body 30 for the purpose of supporting the body 30. Projecting upwardly from the body 30 is an outer tubular wall 35 which is of a diameter considerably larger than the shaft 32. An inner tubular wall 36 consisting of a separate tubular member extends upwardly from the body 30 in position around the shaft 32. The inner tubular wall 36 is provided with threads 37 at its lower end whereby it may be secured to an annular wall 38 which projects upwardly from the bottom 39 of an annular recess 40 formed at the upper end of the body 30 by the tubular walls 35 and 36 which project upwardly therefrom in the manner previously described. Secured on the shaft 32 in position above the recess 40 is a rotary member 42 having a bore 43 which fits closely around the shaft 32, there being a key 44 between the rotary member 42 and the shaft 32 for supporting the rotary member 42 and for preventing its rotation on the shaft 32. For purpose of sealing around the shaft 32 a threaded counterbore 45 is formed in the upper end of the rotary member 42, and in the lower portion of the counterbore 45 packing 46 is compressed by a sleeve 47 which threads into the counterbore as shown and which is prevented from rotating so as to unscrew by a locking screw 48 having a pin 49 which projects into a recess 50 in the shaft 32.

Projecting downwardly from the lower portion of the rotary member 42 is an outer annular wall 52 which is of such diameter as to enclose and fit closely about the upwardly extending outer annular wall 35 of the body 30. An inner annular wall 53 projects downwardly from the rotary member 42 in position enclosing the inner tubular wall 36 of the body 30. The inner annular wall 53 is provided with a shoulder 54 spaced a short distance down from a horizontal wall surface 55 of the rotary member 42, and an inner lip 56 of an anti-friction bearing 57 is secured on the inner annular member 53 and in a position tight against the shoulder 54 thereof by a sleeve nut 58 which may be locked in place by a screw 59. The outer race 60 of the bearing 57 fits closely to the inner cylindrical wall 61 of the outer tubular wall 35, but is of such fit that it may slide vertically relative to the outer tubular wall 35 in accordance with the vertical movement of the shaft 32 and the rotary member 42 necessary to the adjustment of the pump impellers to proper operating position after the placing of the pump in a well.

Through one of the webs 34 a hole 63 is drilled into communication with the lower portion of the recess 40. The hole 63 forms a part of a lubricant delivery means which includes piping 64 extended in positions external of the pump to an accessible point at the top of the well.

The lubricant delivery means includes a check valve means 65 having a closure member in the form of a ball 66 which is held upwardly against a seat 67 by a spring 68, and further includes an annular wall member 69 which is inserted in the recess 40 and makes engagement with the lower portion of the cylindrical surface 61, there being an annular groove 70 in the outer face of the member 69 from which vertical grooves 71 extend upwardly to provide passages cooperating with the lubricant delivery passage for delivering lubricant to an intermediate level in the recess or bearing chamber 40.

At any proper time during the assembly of the submersible bearing structure, a body of lubricant may be placed therein so that when the pump is lowered into the well the presence of lubricant in the recess 40 will prevent entry of water or other substances thereinto through an annular passage 73 around the shaft, an annular passage 74 existing between the inner tubular wall 36 and the inner tubular wall 53, and an annular passage 75 formed between the outer tubular wall 35 and the outer annular wall 52. The lubricant may also be readily placed in the recess 40 after the pump has been assembled and before such pump is lowered into the well, at a time when a pipe 76 shown in Fig. 2 is disconnected from a coupling 77, a small wire being projected down through the pipe nipple 78 to displace the ball 66 from the seat 67 while oil is poured through this portion of the lubricant delivery passage into the recess 40 in which the oil displaces the air as it rises therein.

To offset any unsatisfactory results which might arise from the passage of fluid under pressure and at high velocity through the fluid passages 28 I provide an equalizing passage 80 which extends through the body 30 in position immediately below the bottom 39 of the recess 40 from communication at its inner end with the bore 81 of the body 30 to communication at its outer end with a fluid passage 28. The equalizing passage 80 is part of a hole 82 drilled inwardly from the exterior of the casing wall 29, the outer end of which hole 82 is closed by a plug 83.

When the pump is lowered into water in a well, the lower end of the annular passage 73 will engage the surface of the water in advance of the lower end of the annular passage 75. The pressure of the air trapped in the annular passage 73 and the annular passage 74 will not be sufficient to force any material amount of lubricant out through the annular passage 75 before the lower end of the annular passage 75 has entered the water so as to cause an equalization of pressures exerted on the body of oil or lubricant within the recess 40. If desired, the submersible bearing may be lowered into a well without the chamber 40 thereof being filled with lubricant and the lubricant fed thereinto after installation of the entire pump structure is completed.

The upper end of the piping 64 communicates with an oil inlet 84, as indicated in Fig. 1, which may be employed in forcing oil down through the piping 64, through the check valve 65, and into the bearing recess 40, this oil displacing any water which may exist in the recess 40 above the level defined by the lower end of the inner annular wall 53 and entirely filling the upper portion of the recess 40 in which the bearing 57 resides. When the pump is operated, a fluid pressure exists in the fluid passage 28, the magnitude of which pressure is determined by the number of stages or bowls 13 below the submersible bearing structure 18. This pressure is exerted on the oil in the recess 40 through the annular passages 73, 74, and 75, but such pressure will not operate to force the oil out of the recess 40 through the passage 63 owing to the presence of the check valve 65. Owing to the overlapping inter-engagement of the inner and outer tubular and annular walls of the body 30 and the rotary member 42, escape of oil from the bearing chamber or recess 40 is effectually prevented. The flotative effect of water or the pressure of water within the casing 20 is balanced between the annular passages 73, 74, and 75 communicating with the chamber 40 so that dislodgment of the lubricant will not be caused by either flotation or pressure, and escape of lubricant is also prevented during any time that the level of the water in the well should drop down so as to drain the fluid passages 28 by the upwardly projecting tubular walls 35 and 36 between which the recess 40 is formed.

My new submersible bearing has many advantages, among which are that it will operate without wear resulting from the entry of sand; that its long useful life will prevent disalignment of the shaft and co-operating rotary parts within a pump proper for a period of time much longer than the previous normal life of rotary deep well pumps; that the pump may be completely assembled at the factory and shipped without lubricant other than the small amount necessary to protect the bearings and other metal parts against corrosion; and that the submersible bearing may be assured of proper lubrication by reason of the provision of means for delivering lubricant thereto at desired intervals regardless of whether the pump is in operation or standing idle.

In certain instances I have found it desirable to utilize a soft grease for lubricating purposes instead of the oil. In this event the friction of the grease in the lubricant delivery means is sufficient to prevent any possible upward flow of this grease, and the check valve can thus be dispensed with.

An important feature of my invention is the structure which prevents any loss of lubricant from the bearing chamber during the lowering of the pump unit. This structure is also of inestimable advantage in preventing a flow of this lubricant from the bearing chamber in the event that the level of liquid in the well temporarily falls to a point below the bearing.

I claim as my invention:

1. A submersible bearing of the character described, including: a shaft in upright position; an upwardly directed inner tubular wall surrounding said shaft and an outer tubular wall, there being formed an upwardly faced annular recess between said inner and outer tubular walls; a rotary member on said shaft, said rotary member having an outer annular wall extending downwardly around the outside of said outer tubular wall; a bearing in said annular recess, said bearing being operative between said outer wall and said rotary member; means providing a delivery duct for delivering lubricant to said annular recess; and an outside casing enclosing said walls and said rotary member, said casing having a bottom portion containing a central shaft passing opening and a plurality of upwardly extending fluid passages around said opening.

2. A submersible bearing of the character described, including: a shaft in upright position; an upwardly directed inner tubular wall surrounding said shaft and an outer tubular wall, there being formed an upwardly faced annular recess between said inner and outer tubular walls; a rotary member on said shaft, said rotary member having an outer annular wall extending downwardly around the outside of said outer tubular wall; a bearing in said annular recess, said bearing being operative between said outer wall and said rotary member; means providing a delivery duct for delivering lubricant to said annular recess, there being means for preventing outward flow through said delivery duct; and an outside casing enclosing said walls and said rotary member, said casing having a bottom portion containing a central shaft passing opening and a plurality of upwardly extending fluid passages around said opening.

3. A submersible bearing of the character described, including: a shaft in upright position; an upwardly directed inner tubular wall surrounding said shaft and an outer tubular wall, there being formed an upwardly faced annular recess between said inner and outer tubular walls; a rotary member on said shaft, said rotary member having an outer annular wall extending downwardly around the outside of said outer tubular wall and an inner annular wall extending downwardly around said inner tubular wall; a bearing in said annular recess, said bearing being operative between said outer wall and said rotary member; and an outside casing enclosing said walls and said rotary member, said casing having a bottom portion containing a central shaft passing opening and a plurality of upwardly extending fluid passages around said opening.

4. A submersible bearing of the character described, including: a shaft in upright position; an upwardly directed inner tubular wall surrounding said shaft and an outer tubular wall, there being formed an upwardly faced annular recess between said inner and outer tubular walls; a rotary member on said shaft, said rotary member having an outer annular wall extending downwardly around the outside of said outer tubular wall and an inner annular wall extending downwardly around said inner tubular wall; a bearing in said annular recess, said bearing being operative between said outer wall and said rotary member; means providing a delivery duct for delivering lubricant to said annular recess, there being means for preventing outward flow through said delivery duct; and an outside casing enclosing said walls and said rotary member, said casing having a bottom portion containing a central shaft passing opening and a plurality of upwardly extending fluid passages around said opening.

5. A submersible bearing structure for a vertical rotary pump of the character described, including: a shaft in upright position; a casing adapted for inclusion in the structure of said pump, said casing having an upwardly directed inner tubular wall surrounding said shaft and an outer tubular wall, thereby forming an upwardly faced annular recess between said inner and outer tubular walls, and the bottom of said casing having a central shaft passing opening and a plurality of fluid passages around said opening leading upward to the outside of said outer tubular wall; a rotary member on said shaft and enclosed within said casing, said rotary member having an outer annular wall extending downwardly around the outside of said outer tubular wall; and a bearing in said annular recess, said bearing being operative between said casing and said rotary member.

6. A submersible bearing structure for a vertical rotary pump of the character described, including: a shaft in upright position; a casing adapted for inclusion in the structure of said pump, said casing having an upwardly directed inner tubular wall surrounding said shaft and an outer tubular wall, thereby forming an upwardly faced annular recess between said inner and outer tubular walls, and the bottom of said casing having a central shaft passing opening and a plurality of fluid passages around said opening leading upward to the outside of said outer tubular wall; a rotary member on said shaft and enclosed within said casing, said rotary member having an outer annular wall extending downwardly and closely around the outside of said outer tubular wall; a bearing in said annular recess, said bearing being operative between said casing and said rotary member; a duct for delivering lubricant from an accessible position through the casing to said annular recess, and a check valve in said duct.

7. A submersible bearing structure for a vertical rotary pump of the character described, including: a shaft in upright position; a casing adapted for inclusion in the structure of said pump, said casing having an upwardly directed inner tubular wall surrounding said shaft and an outer tubular wall, thereby forming an upwardly faced annular recess between said inner and outer tubular walls, and the bottom of said casing having a central shaft passing opening and a plurality of fluid passages around said opening leading upward to the outside of said outer tubular wall; a rotary member on said shaft and enclosed within said casing, said rotary member having an outer annular wall extending downwardly and closely around the outside of said outer tubular wall; a bearing in said annular recess, said bearing being operative between said casing and said rotary member; and means providing a delivery duct for delivering lubricant from an accessible position through the casing to said annular recess, there being means for preventing outward flow through said delivery duct.

8. A submersible bearing structure for a vertical rotary pump of the character described, including: a shaft in upright position; a casing adapted for inclusion in the structure of said pump, said casing having an upwardly directed inner tubular wall surrounding said shaft and an outer tubular wall, thereby forming an upwardly faced annular recess between said inner and outer tubular walls, and the bottom of said casing having a central shaft passing opening and a plurality of fluid passages around said opening leading upward to the outside of said outer tubular wall; a rotary member on said shaft and enclosed within said casing, said rotary member having an outer annular wall extending downwardly and closely around the outside of said outer tubular wall and an inner annular wall extending downwardly around said inner tubular wall; a bearing in said annular recess, said bearing being operative between said casing and said rotary member; and means providing a delivery duct for delivering lubricant from an accessible position to said annular recess, there being means for preventing outward flow through said delivery duct.

9. A submersible bearing structure for a vertical rotary pump of the character described, including: a shaft in upright position; a casing adapted for inclusion in the structure of said pump, said casing having an upwardly directed inner tubular wall surrounding said shaft and an outer tubular wall, thereby forming an upwardly faced annular recess between said inner and outer tubular walls, and the bottom of said casing having a central shaft passing opening and a plurality of fluid passages around said opening leading upward to the outside of said outer tubular wall; a rotary member on said shaft and enclosed within said casing, said rotary member having an outer annular wall extending downwardly around the outside of said outer tubular wall; a bearing in said annular recess, said bearing being operative between said outer tubular wall of said casing and said inner annular wall of said rotary member; and means providing a delivery duct for delivering lubricant from an accessible position to said annular recess, there being means for preventing outward flow through said delivery duct.

10. A submersible bearing structure for a vertical rotary pump of the character described, including: a shaft in upright position; a casing having fluid passages therein and a central body having an opening through which said shaft extends well liquid being discharged through said passages, means providing a pressure-equalizing opening extending laterally below the upper surface of said body from said opening to one of said fluid passages, said body having an upwardly directed inner tubular wall surrounding said shaft and an outer tubular wall, thereby forming an upwardly faced annular recess between said inner and outer tubular walls; a rotary member on said shaft and enclosed within said casing, said rotary member having an outer annular wall extending downwardly around the outside of said outer tubular wall; and a bearing in said annular recess, said bearing being operative between said body and said rotary member.

11. A submersible bearing of the character described, including: a shaft in upright position; an upwardly directed inner tubular wall surrounding said shaft and an outer tubular wall, there being formed an upwardly faced annular recess between said inner and outer tubular walls; a rotary member on said shaft, said rotary member having an outer annular wall extending downwardly around the outside of said outer tubular wall; a bearing in said annular recess, said bearing being operative between said outer wall and said rotary member; and an outside casing enclosing said walls and said rotary member, said casing having a bottom portion containing a central shaft passing opening and a plurality of upwardly extending fluid passages around said opening.

12. A submersible bearing of the character described, including: a shaft in upright position; an upwardly directed inner tubular wall surrounding said shaft and an outer tubular wall, there being formed an upwardly faced annular recess between said inner and outer tubular walls; a rotary member on said shaft, said rotary member having an outer annular wall extending downwardly around the outside of said outer tubular wall and an inner annular wall extending downwardly around said inner tubular wall; a bearing in said annular recess, said bearing being operative between said outer tubular wall of said upwardly facing recess and said inner annular wall of said rotary member; and an outside casing enclosing said walls and said rotary member, said casing having a bottom portion containing a central shaft passing opening and a plurality of upwardly extending fluid passages around said opening.

In testimony whereof, I have hereunto set my hand at Los Angeles, California, this 1st day of October, 1929.

JOHN A. WINTROATH.